No. 822,454. PATENTED JUNE 5, 1906.
H. DE F. HUBBARD.
FRICTION CLUTCH.
APPLICATION FILED JULY 11, 1904.
2 SHEETS—SHEET 1.
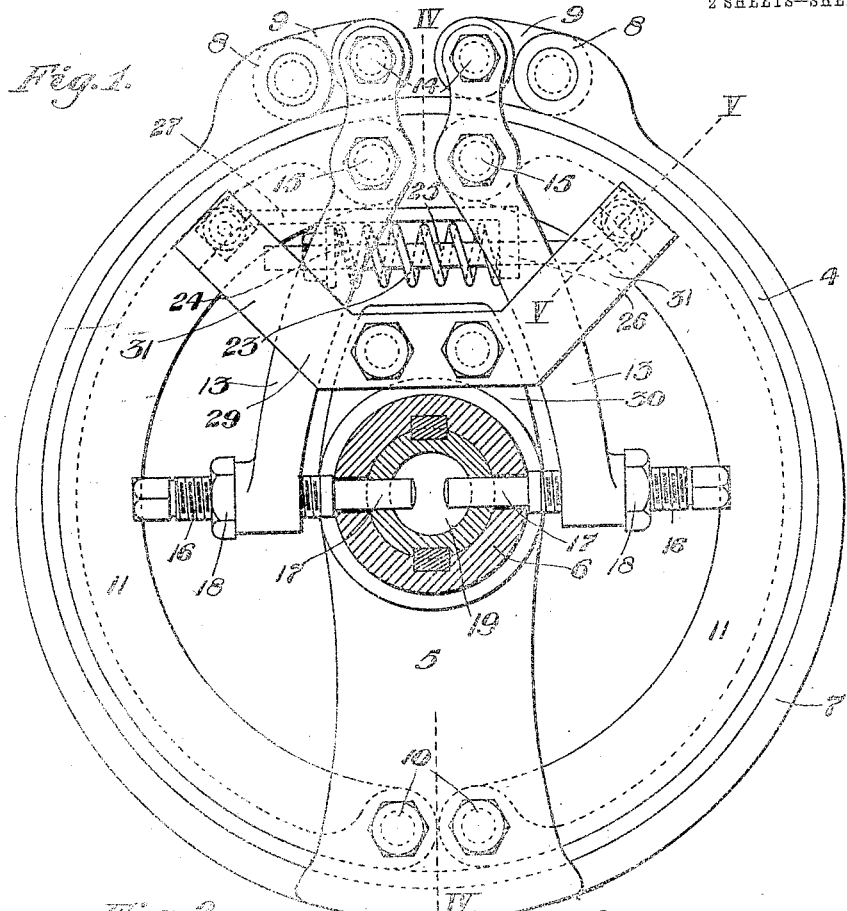
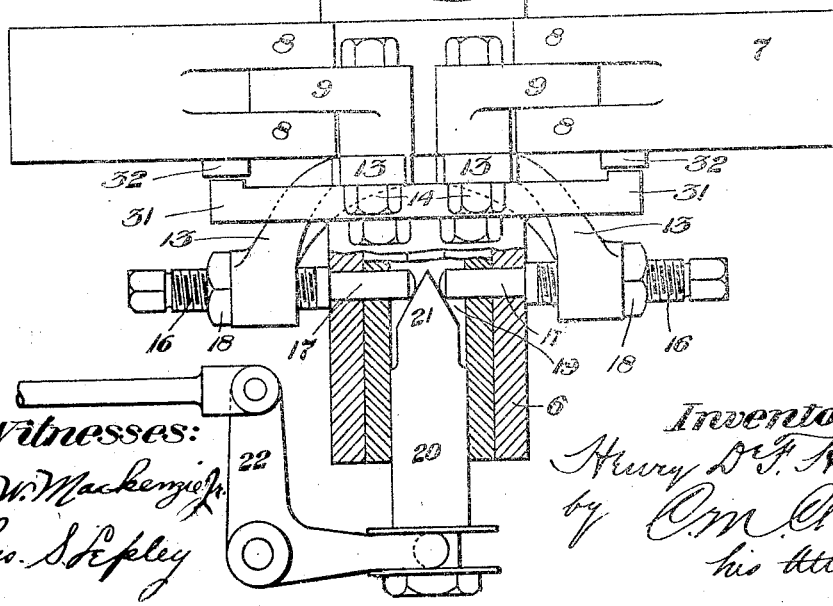
Witnesses:
Geo. W. Mackenzie Jr.
Chas. S. Lepley
Inventor:
Henry De F. Hubbard
by C. M. Clarke
his Attorney No. 822,454. PATENTED JUNE 5, 1906.
H. DE F. HUBBARD.
FRICTION CLUTCH.
APPLICATION FILED JULY 11, 1904.
2 SHEETS—SHEET 2.
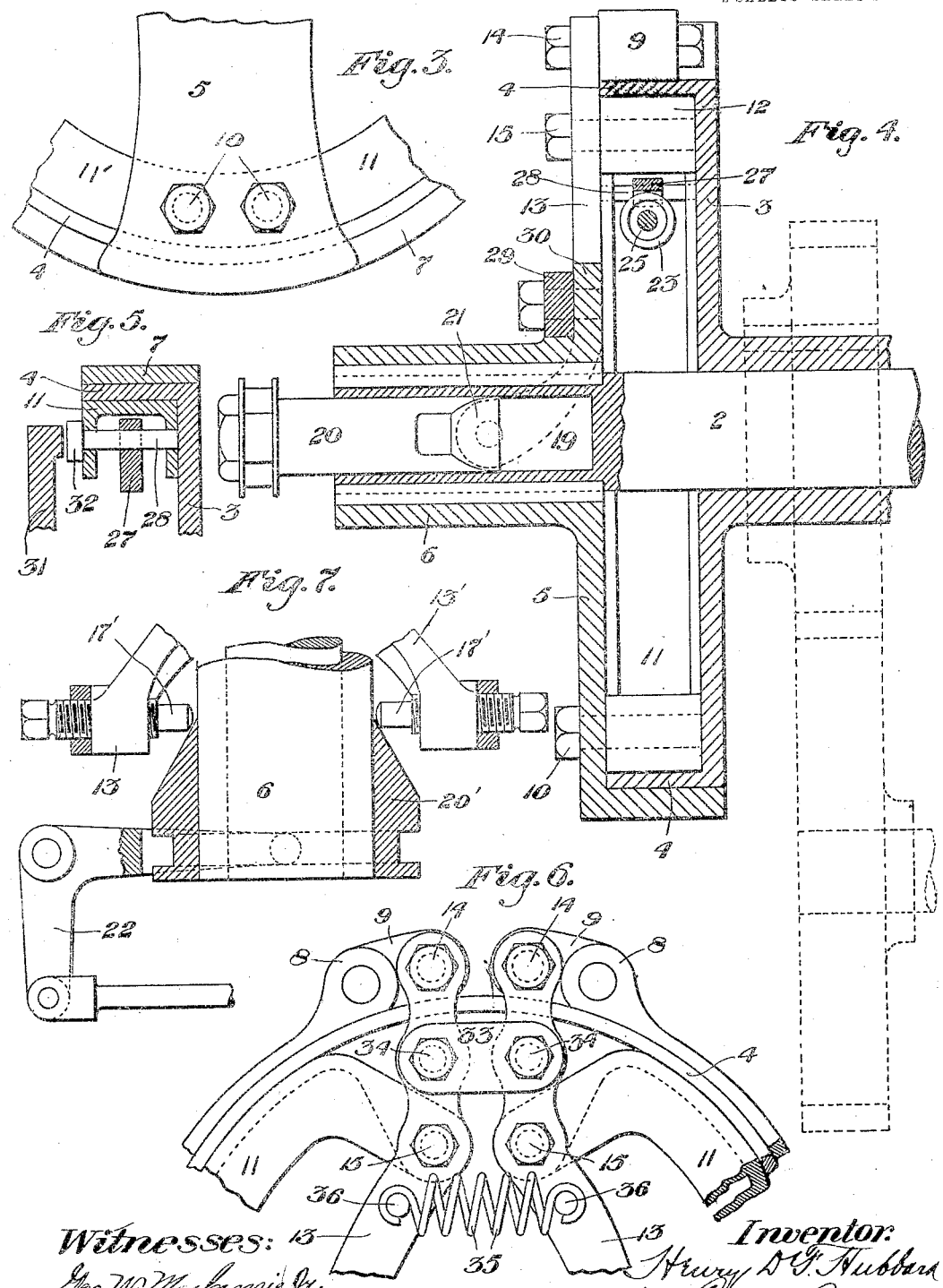

UNITED STATES PATENT OFFICE.

HENRY DE F. HUBBARD, OF AVALON, PENNSYLVANIA.

FRICTION-CLUTCH.

No. 822,454.      Specification of Letters Patent.      Patented June 5, 1906.

Application filed July 11, 1904. Serial No. 215,988.

*To all whom it may concern:*

Be it known that I, HENRY DE F. HUBBARD, a citizen of the United States, residing at Avalon, in the county of Allegheny and State of Pennsylvania, have invented certain new and useful Improvements in Friction-Clutches, of which the following is a specification, reference being had therein to the accompanying drawings, forming part of this specification, in which—

Figure 1 is a face view of my improved friction-clutch, the shaft and bracket-hub being shown in section. Fig. 2 is a plan view of Fig. 1, showing similar parts in horizontal section. Fig. 3 is a partial detail showing the internal friction-shoes made in one piece. Fig. 4 is a vertical sectional view on the line IV IV of Fig. 1. Fig. 5 is a cross-section on the line V V of Fig. 1. Fig. 6 is a partial detail view similar to Fig. 1, showing a modified arrangement of the operating-levers. Fig. 7 is a detail view showing a modified construction of lever-actuating mechanism.

My invention relates to the class of band friction-clutches, its object being to transmit motion from a constantly-revolving shaft to an intermittently-operated element, as a pulley or gear-wheel; and the object of the invention is to provide a mechanism in which the friction clutching devices are brought into contact, so as to transmit movement gradually without sudden shock and also to provide means whereby inner and outer clutches may be applied to corresponding surfaces of the driven member with equal pressure.

Referring to the drawings, 2 is the shaft of a constantly-rotating engine or other prime mover or source of power, upon which is freely journaled the friction-pulley 3, having the peripheral flange 4, the inner and outer surfaces of which are finished smooth and adapted to provide friction-surfaces for the power-transmitting elements of the device.

It will be understood that the pulley 3 is connected with or made a part of any suitable gearing through which it is designed to intermittently utilize the power of shaft 2—as, for instance, the toothed gearing. (Indicated in dotted lines in Fig. 4.)

To the outer end of shaft 2 or to any suitable portion is keyed or otherwise secured the bracket 5, having a suitable hub 6, said bracket being connected to or formed integral with an outer frictional circular clutch-band 7, preferably somewhat tapered toward each extremity, as shown in Fig. 1, to permit of resiliency, and terminating in reinforced eyes 8, to which the operating-levers are connected either directly or by links 9.

Pivoted to bolts 10, mounted in bracket 5, are the inner friction-shoes 11 11, the outer faces of which are adapted to interfit and make binding engagement with the inner periphery of the flange 4, said shoes extending along on each side of connections 10 and terminating closely adjacent to each other at the opposite side in eyes 12.

13 13 are the oppositely-acting levers, each of which is connected by bolts or pins 14 14 and 15 15, respectively, with the terminals of band 7 and shoes 11 on the outer and inner sides of the flange 4. As thus arranged it will be seen that if the outer extremity of levers 13 are forced apart the bearing-bolts 15 will press shoes 11 outwardly into contact with the inner surface of the flange 4 and that bolts 14 will draw the ends of band 7 inwardly, each of such bolts constituting, in addition to its connecting function, a fulcrum for the other bolt and connection.

In the outer ends of lever 13 are mounted bolts 16, terminating in inwardly-projecting pins 17 of reduced diameter, projecting through openings in the hub 6 and shaft 2. The bolts 16 are thus provided with shoulders at their inner ends which limit their inward travel. The bolts are threaded in the ends of lever 13 and provided with lock-nuts 18, so as to provide for adjustment of the outer ends of the levers and locking the bolts in such adjusted position. By this construction the clutch elements may be set so as to require but a minimum amount of travel of the levers 13. The outer end of shaft 2 is hollow, as indicated at 19, and adapted to receive in said hollow cavity a longitudinally-movable bolt or pin 20, terminating at its inner end in a wedge-point 21, adapted to be pressed inwardly by means of a lever 22 and suitable connections or other convenient means, so as to enter between the inner ends of pins 17. As the wedge-point 21 is pressed inwardly the outer ends of the levers 13 are separated, and the clutch-band 7 and shoes 11 are simultaneously brought into engagement with the outer and inner surfaces of the flange 4. By reason of the double connection of the lever it will be seen that an equilibrium of pressure is secured, so that all of the clutch elements are applied equally.

For the purpose of assisting in quickly separating the shoes 11 and also band 7 from contact when wedge 21 is withdrawn a pressure-spring 23 is provided, bearing outwardly at one end against a washer and nut 24 on rod 25 and at the other end against a flanged end 26 of a bar 27.

The rod 25 and bar 27 are mounted between the sides of shoes 11 upon pins 28. For the purpose of insuring free movement of these pins and of preventing their disengagement a bracket 29 is secured to an upwardly-extending portion 30 of the bracket 5, the arms 31 of which bracket extend outwardly over the heads 32 of pins or bolts 28 with slight clearance to permit of movement of the bolts with the shoes 11.

In Fig. 3 I have shown a modified arrangement wherein the friction-shoes 11' 11' constitute the free opposite terminals of one continuous piece, secured in bracket 5' by studs or bolts 10'. This construction is simpler than that shown in Fig. 1, and as the internal friction-shoes are in one piece there is sufficient resiliency to spring inwardly from contact with the flange 4 upon relieving outward pressure of the levers 13. The spring 23 and the other connections are thereby obviated.

In Fig. 6 I have shown a modified arrangement wherein I employ with the levers 13 an intervening connecting-link 33, pivoted at 34 to levers 13 about midway between bolts 14 and 15, thus further insuring equalization and symmetrical operation of the levers. In this construction I provide a tension-spring 35, connected by pins 36 on the levers adapted to draw their outer ends together and to assist in freeing the clutch elements upon withdrawing of wedge 31. By either of these constructions it will be seen that equal pressure is applied to both the inner and outer clutch members and that the entire device may be delicately adjusted, so as to act freely with a minimum amount of movement of the operating-lever. The invention is especially applicable to oil-well engines, pumping-engines, or any type of prime mover from which it is desired to communicate power intermittently during the constant operation of the engine.

In Fig. 7 I have shown a modified mechanism for actuating the levers, consisting in a hollow coniform wedge 20', mounted on the outside of hub 6. This cone is actuated by a lever 22 in the same manner as already described, the adjustable bolt extremities 17' being somewhat shorter and bearing upon the cone at each side, as shown. When the cone is adjusted by the lever, motion will be imparted to the lever-arms 13' and the brake applied in the same manner as already described.

Changes and variations may be made by the skilled mechanic in the design, construction, or the various details of the device without departing from my invention, and all such changes are to be considered as within the scope of the following claims.

What I claim is—

1. A friction-clutch comprising a normally stationary loosely-journaled flanged member adapted to communicate motion, a normally rotating member provided with an outer clutch-band, inner clutch-shoes, and two oppositely-acting operating-levers connected with the terminals of said clutch-band and shoes respectively, with means for actuating the levers, substantially as set forth.

2. A friction-clutch comprising a normally stationary loosely-journaled flanged member adapted to communicate motion, a normally rotating member provided with an outer clutch-band, inner clutch-shoes, and two oppositely-acting operating-levers connected with the terminals of said clutch band and shoes respectively, with means for actuating the levers and for relieving the clutch elements from contact, substantially as set forth.

3. A friction-clutch comprising a normally stationary loosely-journaled flanged member adapted to communicate motion, a normally rotating member provided with an outer clutch-band and inner clutch-shoes, and oppositely acting operating-levers connected with the terminals of said clutch band and shoes respectively, provided with inwardly-extending pins, and a tapered wedge adapted to be inserted between said pins to separate the levers, substantially as set forth.

4. A friction-clutch comprising a normally stationary loosely-journaled flanged member mounted upon a shaft having a central opening, a normally rotating member secured to said shaft provided with an outer circular clutch-band and inner clutch-shoes adapted to make contact with the outer and inner peripheral faces of said flanged member, and oppositely-acting levers connected with the terminals of said clutch band and shoes respectively, with means for actuating said levers, substantially as set forth.

5. A friction-clutch comprising a hollow shaft, a normally stationary flanged member loosely journaled upon said shaft, a normally rotating member secured to said shaft provided with an outer circular clutch-band and inner clutch-shoes adapted to make contact with the outer and inner peripheral faces of said flanged member, and oppositely-acting levers connected with the terminals of said clutch band and shoes respectively, provided with bearing-pins, and an adjustable separating-wedge mounted in the shaft-cavity with means for actuating said wedge, substantially as set forth.

6. A friction-clutch comprising a hollow shaft, a normally stationary flanged member loosely journaled upon said shaft, a normally rotating member secured to said shaft provided with an outer circular clutch-band and inner clutch-shoes adapted to make contact with the outer and inner peripheral faces of said flanged member, oppositely-acting levers connected with the terminals of said clutch band and shoes respectively, means for actuating the levers, with spring devices adapted to withdraw the inner shoes from contact, substantially as set forth.

7. In combination with a rotating shaft provided with a central cavity and a separating-wedge mounted therein, a freely-journaled rotating element provided with a peripheral flange, a rotating bracket secured to the shaft having an outer circular clutch-band adapted to engage the outer surface of the flanged periphery, inner circular shoes, mounted in the bracket and adapted to engage the inner periphery of the flange, and oppositely-acting levers connected with the terminals of said band, and shoes respectively, and means for actuating said levers, substantially as set forth.

8. In combination with a rotating shaft provided with a central cavity and a separating-wedge mounted therein, a freely-journaled rotating element provided with a peripheral flange, a rotating bracket secured to the shaft having an outer circular clutch-band adapted to engage the outer surface of the flanged periphery, inner circular shoes mounted in the bracket and adapted to engage the inner periphery of the flange, and oppositely-acting levers connected with the terminals of said band and shoes respectively, and provided with adjusting-pins extending into the central cavity of the shaft and adapted to be separated by the wedge, substantially as set forth.

9. In combination with a rotating shaft provided with a central cavity and a separating-wedge mounted therein, a freely-journaled rotating element provided with a peripheral flange, a rotating bracket secured to the shaft having an outer circular clutch-band adapted to engage the outer surface of the flanged periphery, inner curved shoes extending oppositely from the bracket and adapted to engage the inner periphery of the flange, and oppositely-acting levers connected with the terminals of said band and shoe terminals respectively, means for actuating the levers, and spring-bars mounted on pins in the shoes and provided with a retracting-spring, substantially as set forth.

10. In combination with a rotating shaft provided with a central cavity and a separating-wedge mounted therein, a freely-journaled rotating element provided with a peripheral flange, a rotating bracket secured to the shaft having an outer circular clutch-band adapted to engage the outer surface of the flanged periphery, inner curved shoes extending oppositely from the bracket and adapted to engage the inner periphery of the flange, oppositely-acting levers connected with the terminals of said band and shoe terminals respectively, means for actuating the levers, spring-bars mounted on pins in the shoes and provided with a retracting-spring, and arms secured to the bracket and extending over the outer ends of the spring-bar pins, substantially as set forth.

11. In a friction-clutch, the combination with a normally stationary loosely-journaled flanged member adapted to communicate motion, a normally rotating member provided with an outer clutch-band, inner clutch-shoes, and two oppositely-acting operating-levers connected with the terminals of said clutch band and shoes respectively; of means for relieving the clutch-bands from contact, substantially as set forth.

In testimony whereof I affix my signature in presence of two witnesses.

HENRY DE F. HUBBARD.

Witnesses:
O. M. CLARKE,
JAMES McC. MILLER.